(12) United States Patent
Lau

(10) Patent No.: US 8,484,972 B2
(45) Date of Patent: Jul. 16, 2013

(54) OCEAN THERMAL ENERGY CONVERSION (OTEC) ELECTRIC POWER PLANT

(76) Inventor: James Chung-Kei Lau, Torrance, CA (US)

(*) Notice: Subject to any disclaimer, the term of this patent is extended or adjusted under 35 U.S.C. 154(b) by 306 days.

(21) Appl. No.: 12/924,199

(22) Filed: Sep. 23, 2010

(65) Prior Publication Data

US 2012/0073290 A1    Mar. 29, 2012

(51) Int. Cl.
  *F03G 7/04*    (2006.01)
(52) U.S. Cl.
  USPC .................................................. 60/641.7
(58) Field of Classification Search
  USPC . 60/641.2–641.7, 641.11, 495; 114/121–126, 114/317, 328, 329, 331, 333
  See application file for complete search history.

(56) References Cited

U.S. PATENT DOCUMENTS

| | | | | |
|---|---|---|---|---|
| 4,110,628 A * | 8/1978 | Paull et al. | ...................... | 290/1 R |
| 4,200,807 A * | 4/1980 | Humiston | ...................... | 290/1 R |
| 4,350,014 A * | 9/1982 | Sanchez et al. | ............... | 60/641.7 |
| 5,513,494 A * | 5/1996 | Flynn et al. | ................... | 60/641.7 |
| 7,969,031 B2 * | 6/2011 | Steelberg et al. | ............... | 290/42 |
| 2007/0289303 A1 * | 12/2007 | Prueitt | ........................... | 60/641.7 |

FOREIGN PATENT DOCUMENTS

GB    2444731 A  *  6/2008

* cited by examiner

*Primary Examiner* — Thomas Denion
*Assistant Examiner* — Philip Eklem

(57) ABSTRACT

Apparatus and methods are disclosed for OTEC plant. The device can be deployed in ocean with depth of 600 meter or more.

15 Claims, 5 Drawing Sheets

OTEC Power Plant Components

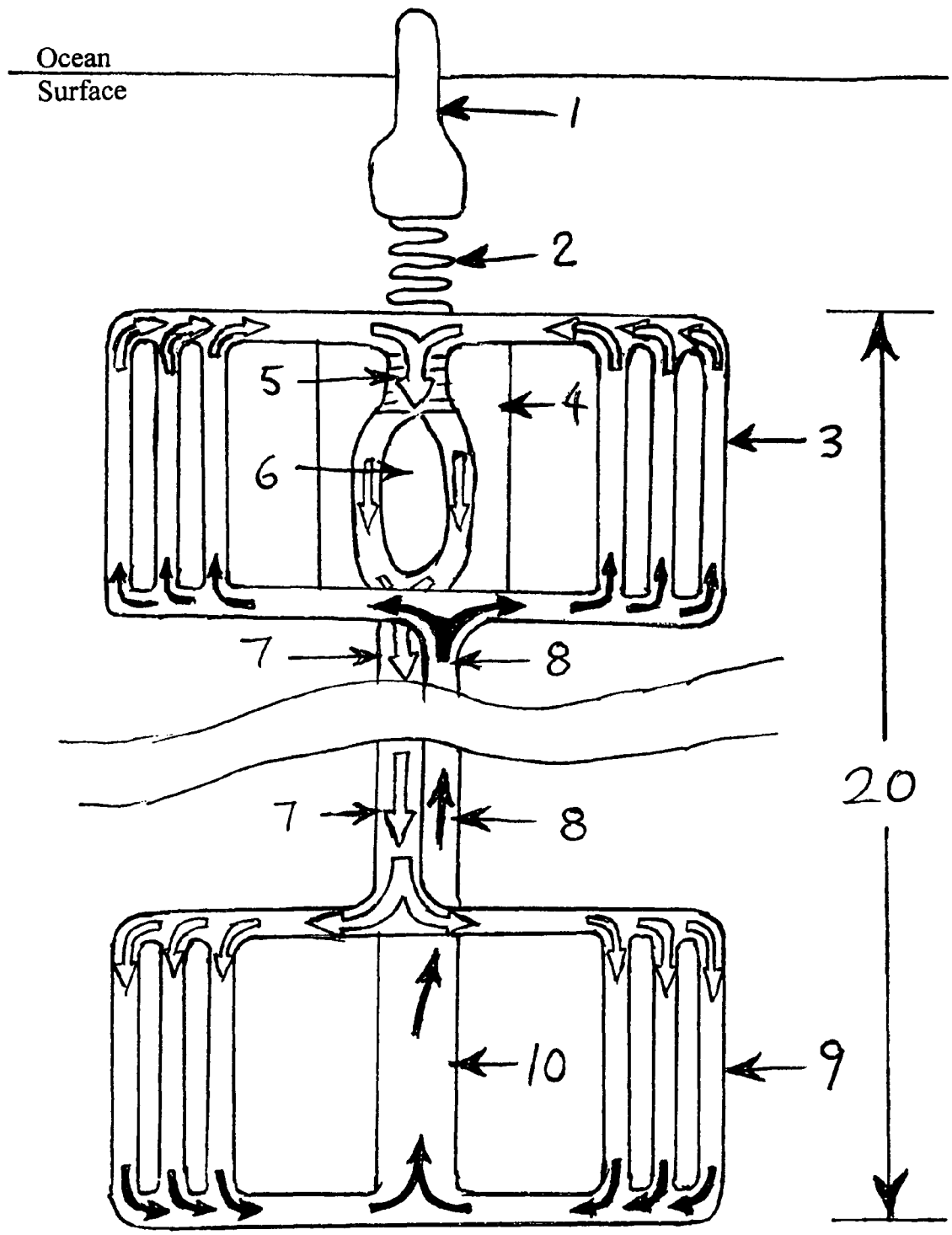
Figure 1 OTEC Power Plant Components

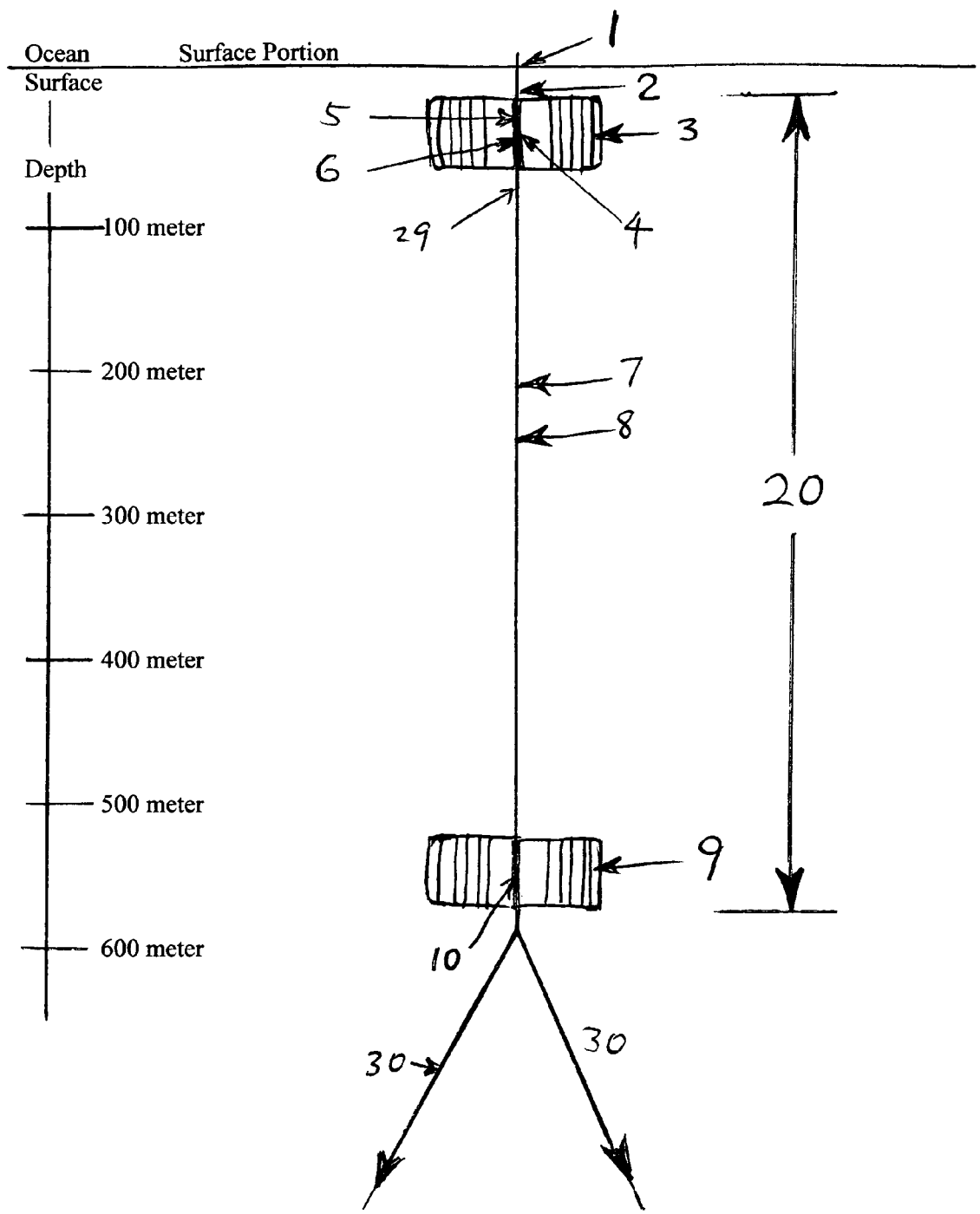
Figure 2 OTEC plant in Operation Configuration

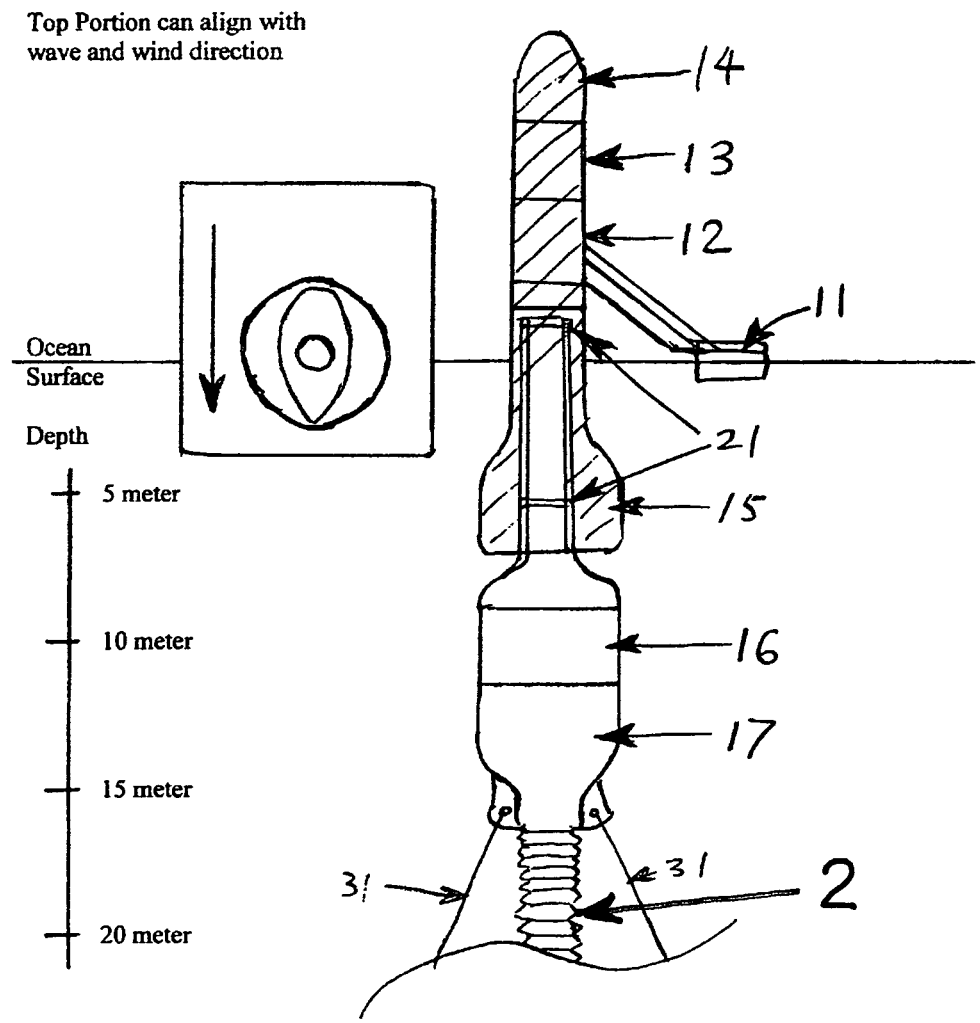
Figure 3 Surface Portion

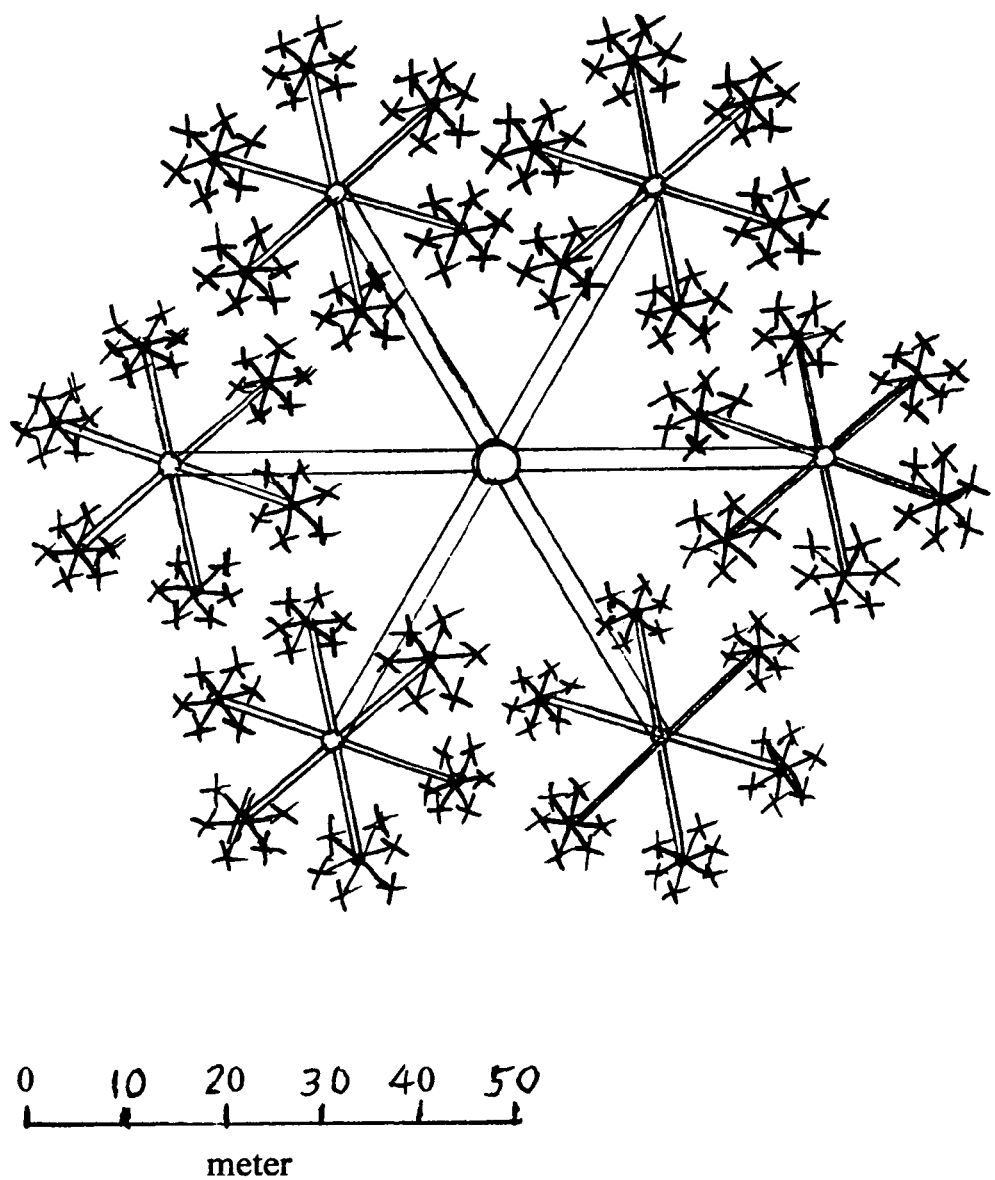
Figure 4 Heat Exchanger Layout

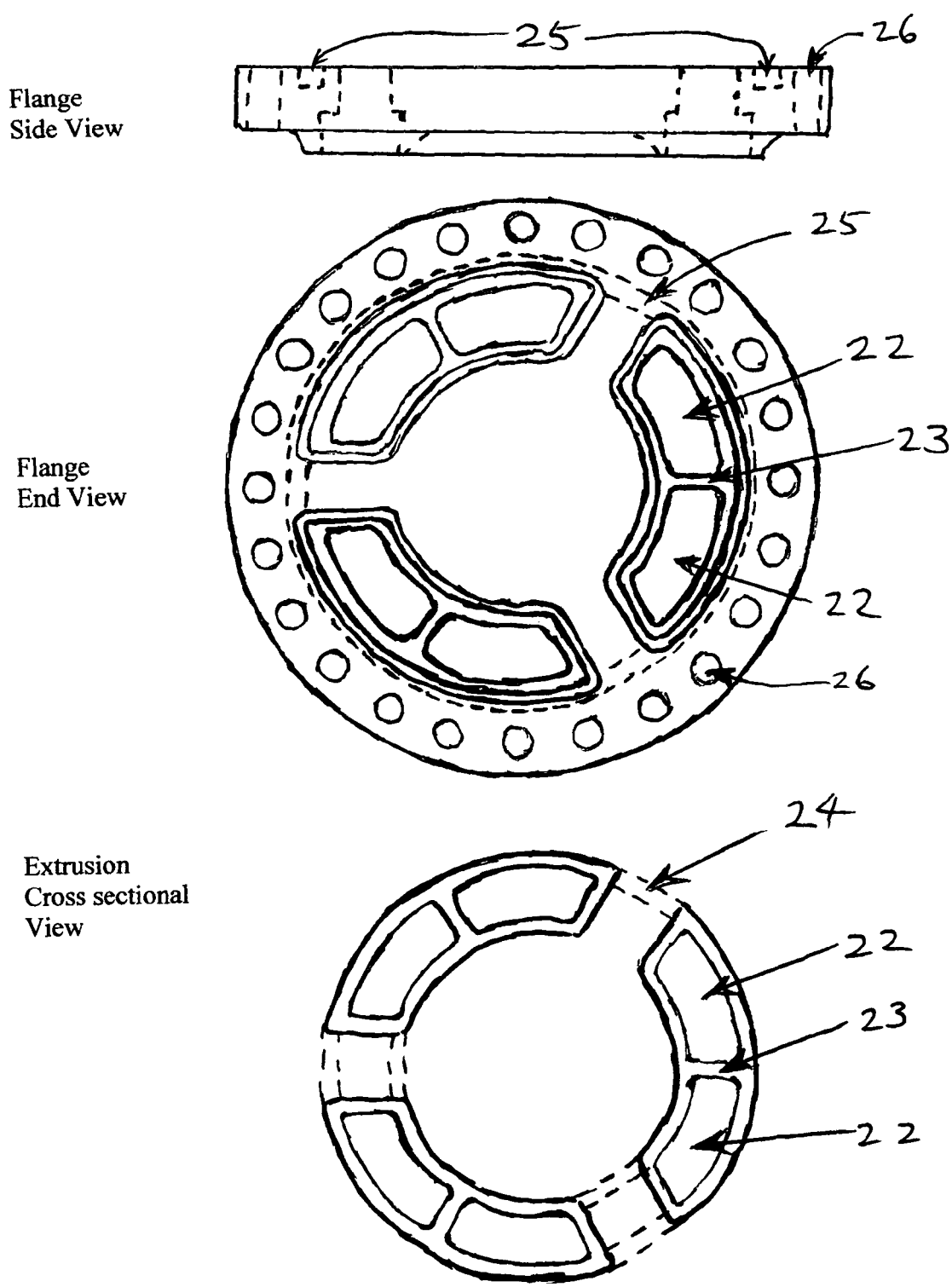
Figure 5 Heat Exchanger Tube and Flange

OCEAN THERMAL ENERGY CONVERSION (OTEC) ELECTRIC POWER PLANT

CROSS REFERENCE TO RELATED APPLICATIONS

This application is related to a large device that is able to capture the thermal energy of the ocean, generate electricity, supply the electricity need for nearby community. The electricity generated may also be used to decompose sea water, thus, converting the energy into alternate form for transport to anywhere in the world.

FIELD OF THE INVENTION

The present invention relates to global renewable energy production.

BACKGROUND OF THE INVENTION

Today, people of the world need a lot of energy for daily living.

For obtaining energy to meet human need, it is not necessary to search outside the earth. Each year, solar radiation provided the earth with about $5 \times 10^{21}$ BTU of energy. This quantity is about equivalent to $1.4 \times 10^{18}$ KWH (kilowatt hour). About 32% of the direct solar radiation is immediately reflected back to space. Most of the absorbed energy is eventually radiated back into space with the characteristic black body temperature of about 10 degree Celsius. A very small fraction of the energy is converted to coal, crude oil and other form and stored for a period of more than 100 years. The short term stored energy available before black body radiation back into space is mostly in the form of ocean surface temperature change (increase, 43% of the energy) and water vapor evaporation (23%). It is estimated that about two percent of the solar radiation energy has later been converted to wind energy. Technology to extract energy from the wind and ocean is at the threshold of able to supply the energy need of the whole world.

The electricity need for the world is about $1.4 \times 10^{13}$ KWH a year. The electricity need is about 0.001 percent of the absorbed solar radiation energy. Generated electricity represented the most important form of economically significant human energy need. It is also possible to convert electrical energy into other form to provide human with almost all energy need. Total solar radiation is about 5,000 times the world energy need. Using the estimate that forty percent of the solar radiation energy has been converted to ocean thermal energy, the ability to use 0.03 percent of the ocean thermal energy would be sufficient to provide all the electricity need.

In tropical area, ocean surface temperature is likely to reach 28 degrees Celsius or more. At the depth of 500 meter, the temperature is 10 degrees Celsius. At even greater depth (about 1000 meters), the temperature is 4 degrees Celsius, the maximum water density temperature. The available thermal energy for each square kilometer (to 500 meter depth) is roughly equivalent to the energy of 250 meter of water at a temperature difference of 15 degrees Celsius. The value is $(250)(100)(1000)(100)(1000)(100)(15) =$ $(3.75)(10^{15})(\text{calories}) = (1.57)(10^{16})$ Joules $= (4.3)(10^9)$ Kilo-Watt-Hour Each square kilometer of ocean may receive a maximum of $(1.35)(10^9)$ watts of energy. Using 8 hours $[(2.88 \times 10^4)$ seconds$]$ as the equivalent time during each day that maximum solar input is possible, the possible maximum daily energy input is about $(3.9 \times 10^{13})$ Joules. The available heat content of the ocean surface (to 500 meter depth) is equivalent to more than 400 days of deposited solar energy. The heat content of the ocean to 1000 meter depth is equivalent to 1000 days of deposited solar energy. For each square kilometer of the tropical ocean, the stored thermal energy is about $(3.9 \times 10^{16})$ Joules, or 9.2 Megaton of TNT. The energy stored in 10 square kilometer of the tropical ocean is greater than the energy of any hydrogen bomb ever made. The ocean is actually a much better energy reservoir then the oil deposit for the world. The energy is replenished daily by the sun. As long as the earth stay is orbit around the sun and the solar radiation stay at close to the current level, the energy supply is available.

If the OTEC plant is situated close to a significant electricity user, the generated electricity may be connected to the power grid. The energy use efficiency will be higher. If the energy storage form is liquefied hydrogen, the energy use efficiency will be lower as it is unlikely that one hundred percent of the hydrogen energy can be converted back to electricity again.

SUMMARY OF THE INVENTION

The present invention is adapted to be embodied in a floating or semi-submerged structure.

BRIEF DESCRIPTION OF THE DRAWINGS

The structure and manner of operation of the invention, together with the further objects and advantages thereof, may best be understood by reference to the following description taken in conjunction with the accompanying drawings, in which identical reference numerals identify similar elements, and in which:

FIG. 1 is showing the components of this OTEC power plant.

FIG. 2 is a side view of a OTEC plant in a fully operating configuration according to various embodiments;

FIG. 3 is the near surface portion.

FIG. 4 is the heat exchanger layout. The working fluid is distributed in the hot and cold zones and is able to flow in parallel channels.

FIG. 5 show some features of the heat exchanger components.

Only the working fluid (carbon dioxide or ethane) is under "forced" circulation.

Unlike the 1980 experiment in Hawaii, there is no need to move either cold or warm seawater. The working fluid shall be transferred from the warm region to the cold region and back to the warm region inside steel (or steel reinforced concrete) tube. Instead of relying completely on reduced temperature for working fluid condensation, induced pressure may also be used to promote condensation.

Semi-submerged structures anchored to the ocean floor will be used to secure the OTEC plant. The 5,000 to 15,000 ton structures (may include enclosed water) should have enough stability. There is a lot of mass to be included in the design to achieve stability.

At 500 meter depth, the seawater pressure is about 800 psi. The seawater temperature is about 1° C. Carbon steel with 40,000 psi strength containing low pressure gas inside will need minimum wall thickness to radius ratio of 1 to 50. For steel tubing to reach neutral buoyancy the wall thickness to radius ratio should be 1 to 16. Leak tight steel tube (or steel reinforced concrete) with neutral buoyancy is perfectly capable of operation in the depth under consideration. The actual optimum depth of the bottom heat exchanger may be between 500 and 1000 meter. The sea water pressure may be as much as 1500 psi, still well within the material strength limit. The Optimum condition may be defined as the maximum amount of electricity generated per unit displacement.

Biological fouling of the heat exchanger tube from the inside is impossible because only the non-corrosive, high purity working fluid moved inside the tubes. At 500 meter depth, biological activity is much reduced so that the biofouling of the heat exchanger tube exterior is practically non-existing. Even for the warm water heat exchanger near the surface, the naturally circulation seawater will not severely affect the performance. The warm water heat exchanger will be placed deeper than the depth most marine life would feed to make sure that the OTEC plant is away from bad weather. As long as the biological activities do not severely impede seawater to working fluid heat transfer through the heat transfer tube wall (with coatings to control corrosion), the OTEC plant will function near peak capacity. Barrier to prevent ocean creature from direct contact with the OTEC heat exchanger may be set up. Periodic cleaning of the top heat exchanger, if necessary, would increase the OTEC plant operating cost.

The heat exchanger to seawater interaction may cause convective seawater flow. If the convective flow is strong, the heat exchanger may effectively be able to interact with more seawater and allow the OTEC plant to operate at higher power capacity. As indicated in the previous section, the stored energy in the ocean surface is more than equivalent of 1000 days (12000 hours) of continuous solar radiation, even slow water circulation will be able to help extract the thermal energy farther away from the OTEC plant. The natural circulating effect allowed any OTEC plant expelled wasted heat to be used again.

Unlike wind mill of solar voltaic where the appropriate condition for generating renewable energy is a small fraction of the day (or year), OTEC power plant can operate 24 hours a day, 365 days a year at near maximum capacity. There is more than 8600 hours in a year that OTEC electric power plant can generate electricity. The cost of electricity will be lower than electricity generated by any other method (renewable or not).

DETAIL DESCRIPTION OF THE INVENTION

Referring initially to FIG. 1, the OTEC plant includes the surface portion 1 and the main portion 20. The surface portion is used to help make sure the OTEC plant can be visually located by human eye on the ocean surface. The electricity generation part is within the submerged main portion 20. The surface portion and the main portion are connected by a flexible connector 2 so that as the surface rise and fall with the wave, the force transmitted to the main portion can be reduced.

Near the top side of the main portion 20 is the hot heat exchanger 3, this part can also be called the evaporator. The working fluid as liquid enters from the bottom. The outside hot sea water is able to convert the working fluid into vapor through thermal conduction across the heat exchanger wall. The vapor will enter the top of the turbine 5. The electromagnetic inductor 6 will convert the energy into electricity. The generated electricity can be transmitted by power cable to nearby location for use. The vapor will then move toward the bottom in the downward flow portion of the main tube 7. The buoyancy adjustment tank 4 placed close to the surface will be filled partially with sea water. The quantity of sea water is adjusted so that the main portion is at the optimum depth. The optimum depth for the main portion is in the range of 10 to 40 meters for the top of the main portion. The main tube should be as close to vertical as practical.

At the bottom of the main portion is the condenser 9 (or called cold heat exchanger). The condenser is at least 500 meter below the evaporator. The downward flow vapor will be distributed among the heat exchanger tubes. The pressure should be enough to condense the vapor into liquid. The liquid is then pumped using pumps 10. The pumps need to generate enough pressure so that the working fluid liquid is able to enter the evaporator (at high pressure). The power to operate the pump would use part of the electricity generated by the inductor. This figure indicated that the working fluid flows in a closed cycle.

Referring to FIG. 2, the size of the OTEC plant is indicated by the attached scale. To make sure that there is no need to transport the hot and cold ocean water, the evaporator and the condenser must be placed in the hot and cold zone. The distance between the hot and cold zone is at least 500 meters. The OTEC plant is therefore large. The total mass of the OTEC plant is practically identical the mass of the sea water the OTEC plant displaced, making the OTEC plant reach neutral buoyancy. The OTEC plant may use the lower cost concrete for its construction, making it less costly than the structure using more steel. The complete OTEC plant is anchored (anchor cable 30) to the bottom of the ocean. The anchors will be connected to the main portion 20. Optional connection to the surface portion 1 may also be used.

Referring to FIG. 3, the surface portion can include ship (or boat) docking facility (11), utility deck (12), observation deck (13) communication deck (14), living and quarter (15) control deck (16), and its own ballast (17) for buoyancy adjustment. There may be tube connection (18) to the main portion. Anchor cable (31) to the sea bottom is optional. Vertical tunnel with multiple locks at the bottom of the surface portion shall be a passage way to the main portion during calm weather. At periods of severe weather, the passageway to the main portion shall be closed and locked.

The surface portion is designed to be stable under all weather conditions. The structure is mostly below the ocean surface. The strong airfoil structure as indicated by the box insert at the top left of the sketch with width of up to 4 meters is designed to rise above the ocean surface to a height of between 10 to 15 meters, providing an additional 100 tons of buoyancy. The above surface structure with the streamline cross section will align with the prevailing flow direction (indicated by the arrow in the inserted rectangular box in FIG. 3) and incur minimum stress. The bearings (21) are included to make sure that the surface portion can align with the wind and wave direction to minimize stress during severe weather. The shaded region in FIG. 2 is able to freely rotate.

It is possible to use the alternate design where the surface portion only rises above the ocean surface to a height of one meter. The small stream line cross sectional shape is expected to incur very small stress during the most severe weather. The spherical shape region of the surface portion should include pressure sensor and pumps to monitor and adjust its depth so that the surface portion can be at the depth that the stress due to severe weather is well within it's structural strength. The surface portion may be pulled down to reach a depth of 100 meter during the most severe weather.

Another design for the near surface portion is to continuously control the near surface portion depth. The tension in the anchor is made high enough to compensate for the buoyancy of the complete structure. Depth sensor in the near surface portion is used to determine the depth of the near surface portion. During calm weather, the near surface portion can have more than 100 cubic meter of volume above the ocean surface for easy access. During moderate weather, the surface portion above the surface volume can be reduced to about 10 cubic meters to reduce structural stress. Both the anchor cable tension and ballast tank will be used to maintain the desired depth. The ballast tank will hold enough seawater so that the total system positive buoyancy is between 10 to 100 tons. The cable can be shortened so that the desired depth is maintained. For severe weather, the near surface portion may be completely submerged under the ocean surface, the force on the cable should be able to hold the system with 10 to 100 tons of positive buoyancy at least 20 meter below the ocean surface. Actual operation condition record will be the guide for how deep the near surface portion needs to be maintained. Even if the near surface portion is 100 meter below the ocean surface, where the ocean should be very calm, the maximum bottom depth would still be less than 750 meters. The structure will be able designed to survive the 1500 psi external pressure.

The top part of the main portion shall include the extendable passageway (21) with multiple locks. During calm weather, the passage way is extended and open to the surface portion. During severe weather, the passageway is closed.

The main electricity generating turbine (5) is placed in the main portion. Warm working fluid from the warm water heat exchanger (3) entered the turbine from the top and the expanded vapor exit through the bottom into the downward flowing tube (7).

The warm water heat exchanger (25) uses marine grade aluminum (such as 5086) pipes with protective coating. The surrounding seawater will heat the working fluid.

The downward flowing tube (7) is designed to reach a depth of about 500 (or more) meters. The downward flowing tube diameter is more than 1 meters. At 2.45 meter outside diameter downward flowing tube internal cross sectional area for the downward flow is approximately 4.3 square meter. The downward flowing tube wall may be consisted of 5 mm (or 4 to 10 mm) thick steel and 100 mm (or 50 to 150 mm) thick steel reinforced concrete. The downward flowing tube is designed to have small negative buoyancy to help stabilize the main portion. Many different combinations of steel and steel reinforced concrete can be used to fabricate the downward flowing tube. The downward flowing tube may be constructed in sections above the ocean surface and the completed sections may be lowered into the ocean until the full length is fabricated.

The bottom heat exchanger (9) is connected to the downward flowing tube and the compressor (optional) inlet. The optional compressor powered by a portion of the electricity generated by the main turbine (6) is designed to compress the cooled working fluid into liquid. The cold water at the bottom of the main portion is used to keep the working fluid liquid cold. The liquid is then pumped to the warm water heat exchanger (3) using the upward flowing rube (8) and pumps (10). If a series of pump is used to get the liquid working fluid into the evaporator, the last pump may be located in a reservoir (29) of liquefied working fluid. The warm water heat exchanger internal pressure may be partially controlled by the amount of liquid working fluid injected into the warm water heat exchanger. The warm water heat exchanger is able to convert the working fluid into vapor before entering the main turbine inlet.

FIG. 4 is a sketch of one way to distribute the heat exchanger. Many parallel tubes combined together to form the heat exchanger. The 216 crosses in FIG. 4 are used to represent 36 heat exchanger tubes (two more steps of six fold spreading) in the actual proposal. Trying to draw 7776 tubes on a piece of paper is not practical. The proposed tube spreading design is based on hexagonal shape to divide the fluid flow. Other methods to divide the fluid to flow in multiple heat exchanger tubes are also acceptable. The proposed example has 7776 tubes of 40 meter length each for warm and cold water heat exchanger. Each Heat exchanger tube for vaporized working fluid can have about 100 mm diameter and 0.008 square meter cross sectional area. When the working fluid is in liquid state, the cross sectional area required to transport the liquid is much smaller. Each larger diameter vapor transfer tube shall be connected to multiple smaller diameter liquid transfer tubes. The combined heat exchanger area for either the warm or cold water heat exchanger is about 55 square meter. The heat exchanger spread out from the main flow tube to a distance of about 50 meters (the range can be from 25 to 80 meters).

The 100 mm diameter hollow cylinder with 3 mm thick wall is able to transfer heat to the working fluid effectively. Using the thermal conductivity of 5086 aluminum, (70 watt/m-K), at the temperature difference of 0.2 degrees Celsius (between the working fluid and the ocean water), each meter length of the tube is able to transfer heat at the rate of:

$$70 \times 0.1 \times \pi \times 0.2 \times 1/0.003 = 1,450 \text{ watt}$$

To transfer heat at the rate of 24,000,000 watt at the warm heat exchanger, the required total tube length would be about 17,000 meter. Even if we reduce the temperature difference between the working fluid and the ocean water to 0.05 degrees Celsius, the total required heat exchanger tube length would only be 68,000 meter. Using the 7776 tubes as indicated in FIG. 4, each of the parallel heat exchanger tubes only need to be less than 10 meter length. Actual design detail would be established after the theoretical calculation is compared against measured experimental data. The heat exchanger tubes for liquid working fluid with additional heat transfer surface should be more effective in transferring heat from the ocean to the working fluid. At the condenser (cold heat exchanger), heat is transferred from the working fluid to the ocean water outside. The amount of heat transfer is greater than the turbine generator power because the phase transition energy is not converted at the turbine generator.

FIG. 5 is included to show that the cross sectional shape of the extruded heat exchanger. The heat transfer surface area is much higher than the simple cylinder. Machining as indicated by the dashed line 24 in the bottom portion of FIG. 5 can also allow the leak tight heat exchanger tubes to be able to accommodate sea water at the center and allow for heat to transfer from the center of the tubes. The extruded heat exchanger tube will initially included the dashed line portion. Along the extrusion at regular internals, the dashed line portion will be cut out by machining (or other method) allowing the center of the extrusion to be accessible by ocean water and increase heat transfer surface. The flow channels 22 can have internal structural support 23 so the wall thickness can be reduced to enhance heat transfer. The optimum wall thickness is achieved by balancing the need for maximum heat transfer and satisfactory heat exchanger tube reliability (corrosion resistance, long operation life).

The extruded tubes can be welded to the flanges. Properly designed O-rings (in O ring grove 25) are used to make sure the joints are leak tight and able to operate reliably under pressure of up to 1500 psi. The typical method of using bolts (through holes 26) and nuts exerting high compressive force on the flange surfaces (and Oring material) should be satisfactory.

Many fluids with vapor pressure of greater than 30 psi at 10 degrees Celsius may be used as the working fluid. Ammonia, Freon and other fluids commonly used for air conditioning are examples. Ethane and carbon dioxide with greater pressure differential at the cold and hot temperature zone are preferred. For this discussion, carbon dioxide is used as representative of the working fluid.

The vapor pressure of carbon dioxide at 9.44 and 27.22 degrees Celsius are about 641 and 976 psi respectively. The warm water heat exchanger is able to increase the internal energy content (temperature increase and phase change) of carbon dioxide. The selected cold and warm heat exchanger temperature will be slightly different for OTEC plants in different parts of the world. The temperature difference should be greater than 15 degrees Celsius.

Each cubic meter of ideal gas at 976 psi pressure can generate about $3.0 \times 10^6$ joules of mechanical (converted electrical with induction) energy after expansion to a higher volume (about 1.55 cubic meter) at 641 psi pressure. For power generation of 15 megawatt ($1.5 \times 10^7$ joules per second), flow rate of 5 cubic meter (at the high pressure, 7.7 cubic meter per second at the lower pressure) per second is necessary. The proposed design is able to meet the flow rate requirement with average flow speed of 1.5 meters (2.6 meter per second at the reduced pressure) per second. Carbon dioxide at this temperature range is expected to deviate from the ideal gas, but similar energy retention and release is expected.

Because the cold heat exchanger is situated far lower than the warm heat exchanger (and the turbine). The fluid below the turbine (with finite density) will have increasingly higher pressure at greater depth. Since 641 psi pressure is sufficient for the fluid to condense, the outlet pressure of the turbine can be lower than 641 psi. Using a design that the depth would increase the pressure by 100 psi, the turbine outlet pressure can be allowed to drop to 541 psi. At the same flow rate, (10 cubic meter per-second at the 541 psi pressure) the turbine will generate about 18 megawatt of power. The greater pressure drop between the inlet and outlet of the turbine therefore allow the turbine to generate more electric power. This increase of electric power should be compensated by the increase pumping power that would be required to push the working fluid back into the warm heat exchanger.

The critical factor for controlling the OTEC plant power output is pumping the working fluid into the warm heat exchanger. Without continuing working fluid supply, the pressure differential for the turbine inlet and outlet will disappear and the turbine will not turn any more. Valves may be added in the control design.

Methods to monitor the condition of the OTEC plant are desirable. The OTEC plant may separate the working flow into isolated separated parallel paths. The separated paths may be leak tight individually. Valves may be installed so that the working fluid can avoid the damaged paths. The flanges with O-ring should be able to provide good seal at the moderate temperature and pressure. Secondary coating for environmental protection may impede heat transfer slightly. Cost and benefit analysis should be conducted for any proposal to provide added assurance against leak.

For the proposed 12 megawatt (MW) OTEC electric plant, the daily energy generation is $1.0 \times 10^{12}$ joules. If the energy is stored as liquid hydrogen, the mass is 6 metric ton, occupying a volume of 130 cubic meters. Liquid hydrogen density is 0.07 gm/cc and the energy content is 120 mega-joules per kilogram or 8 mega-joules per liter. The storage capacity required for monthly shipment would be 3000 cubic meters, the mass of the hydrogen would be 210 tons. Floating storage tank would have less total weight and is probably more economical. Storage tank of neutral buoyancy would be heavier, but the ability to submerge the storage tank under the ocean surface during severe weather would greatly enhance the system reliability.

The proof of concept OTEC ocean model may be smaller then the 12 megawatt power plant described in the previous paragraph. The main tube diameter may be only 25 cm. A 60 kilowatt OTEC plant should cost less than one million dollars. The full scale plant may be able to generate 20 megawatts of power if the fluid flow rate and other parameters are increased.

For OTEC plant placed close to shore (less than 15 miles) submerged cable can transport the electricity to onshore facility. Power transmissions lines usually use high transmission voltage to minimize electrical current. The transmission line voltage should be more than 50 KV.

Apparatus to decompose seawater into hydrogen and oxygen using the generated electrical energy can be included in the main portion for OTEC plant located far away from shore. There should also be the ability to condense hydrogen (and/or oxygen) into liquid. Liquid hydrogen and oxygen may be stored inside the main portion or in tanks attached to the main portion. On shore hydrolysis plant (limited to OTEC plant not too far from shore) is probably easier to built and operate.

What is claimed is:

1. A closed cycle OTEC (Ocean thermal Energy Conversion) electricity generating plant comprising:
   a surface portion with positive buoyancy and a passage way connection to a submerged main portion, and
   a submerged power generation and energy storage portion (main portion) that includes a submerged warm water heat exchanger near the surface for vaporizing an enclosed working fluid, a cold water heat exchanger at depth for condensing the enclosed working fluid into liquid, an electricity generating turbine/inductor near the surface to convert energy within working fluid vapor exiting the warm water heat exchanger into electricity, and a pump at depth to move liquefied working fluid up toward the warm water heat exchanger;
   wherein the working fluid circulates through the warm water heat exchanger, the turbine/inductor, a vapor flow tube toward the bottom cold heat exchanger, the pump and a liquid flow tube back to the warm heat exchanger;
   wherein sea water is not caused to move with respect to either heat exchanger because the working fluid within either heat exchanger is sufficiently distributed in parallel flow and surround by the sea water, with thermal conduction across the heat exchanger sufficient to achieve a predetermined amount of heat energy transfer;
   wherein there are ballast tanks in both the surface and main portions to adjust the buoyancy by partially filling and emptying the ballast tanks;
   wherein there is a connection to an anchor at the bottom of the ocean where the anchor connection to keep the top of the submerge portion at a predetermined depth.

2. The OTEC plant of claim 1, wherein the surface portion includes facilities for docking ships or boats, devices for communications and a connection to the main portion.

3. The OTEC plant of claim 1, wherein the surface portion is small and is used only to help locate the OTEC plant.

4. The OTEC plant of claim 1, wherein power is generated by allowing the working fluid, which has been converted into vapor after being heated at the warm water tap heat exchanger, to flow through the turbine/inductor and to be subsequently condensed into liquid at the cold water heat exchanger.

5. The OTEC plant of claim 1, wherein the working fluid is ammonia or Freon.

6. The OTEC plant of claim 1, wherein the working fluid is ethane, other hydrocarbon or carbon dioxide.

7. The OTEC plant of claim 1, wherein the connection between the surface portion and the main portion includes a passage way for humans, and wherein the passage way may be disconnected during periods of severe weather, with the passage way sealed.

8. The OTEC plant of claim 1, wherein the connection between the surface portion and the main portion includes a device for keeping the main portion at the desired depth.

9. The OTEC claim of claim 1, wherein a main portion depth may be adjusted to optimize energy production during favorable weather and lowered to greater depth during periods of severe weather to avoid damage.

10. The OTEC plant of claim 1, wherein vapor flow tube has cross sectional area of greater than one square meter to allow the working fluid exiting the turbine to reach the cold water heat exchanger.

11. The OTEC plant of claim 2, wherein the liquid flow tube to transport the liquefied working fluid to the top to enter the warm heat exchanger is placed inside the connection between the surface portion and the main portion.

12. The OTEC plant of claim 1 wherein each heat exchanger is able to bring the working fluid temperature to within a predetermined amount of the surrounding sea water temperature.

13. The OTEC plant of claim 1, wherein the surface portion is able to align to a least resistance direction of the wind and water flow direction.

14. The OTEC plant of claim 1, wherein there is an electrical transformer inside the main portion to increase the voltage of generated electricity.

15. The OTEC plant of claim 13, wherein there is power a transmission cable connecting the OTEC plant to a shore installation, allowing the electricity generated to reach consumers.

* * * * *